United States Patent [19]

Skura et al.

[11] 4,392,842
[45] Jul. 12, 1983

[54] TOOTHED POSITIVE DRIVE POWER TRANSMISSION BELT WITH A FABRIC REINFORCEMENT SUSPENDED WITHIN THE BELT TEETH

[75] Inventors: William A. Skura, Naugatuck; Thaddeus F. Cathey, Woodbury, both of Conn.

[73] Assignee: Uniroyal, Inc., New York, N.Y.

[21] Appl. No.: 195,725

[22] Filed: Oct. 10, 1980

[51] Int. Cl.³ .............................................. F16G 1/28
[52] U.S. Cl. .................................... 474/205; 474/250
[58] Field of Search ............... 474/205, 250, 251, 252, 474/265, 266, 267; 156/138, 139, 140; 427/115

[56] References Cited

U.S. PATENT DOCUMENTS

| | | | |
|---|---|---|---|
| 2,062,568 | 12/1936 | Freedlander | 474/264 |
| 2,163,347 | 6/1939 | Nassimebene | 474/264 |
| 3,473,989 | 10/1969 | Richmond | 474/250 |
| 3,756,091 | 9/1973 | Miller | 474/205 |
| 3,937,094 | 2/1976 | Cicognanni | 474/205 |
| 3,968,703 | 7/1976 | Bellman | 474/261 |
| 4,099,422 | 7/1978 | Cicognani | 474/205 |
| 4,131,030 | 12/1978 | White, Jr. | 156/139 |
| 4,177,686 | 12/1979 | Jacob | 474/251 |

FOREIGN PATENT DOCUMENTS 55-163602  5/1980  Japan.

Primary Examiner—Lawrence J. Staab
Assistant Examiner—Andrew Joseph Rudy
Attorney, Agent, or Firm—Henry Sternberg

[57] ABSTRACT

A toothed positive drive power transmission belt of the type having an endless substantially inextensible tensile member to which the belt teeth are secured, which teeth have a curvilinear cross-section and may be covered by an outer protective fabric or the like. In the body of each tooth is a layer of fabric reinforcement separated from the outer surface of the belt teeth by a cushion layer of soft elastomeric material so that the outer surface is free to flex while the inner portion of the tooth is reinforced against shearing.

13 Claims, 2 Drawing Figures

U.S. Patent
Jul. 12, 1983
4,392,842
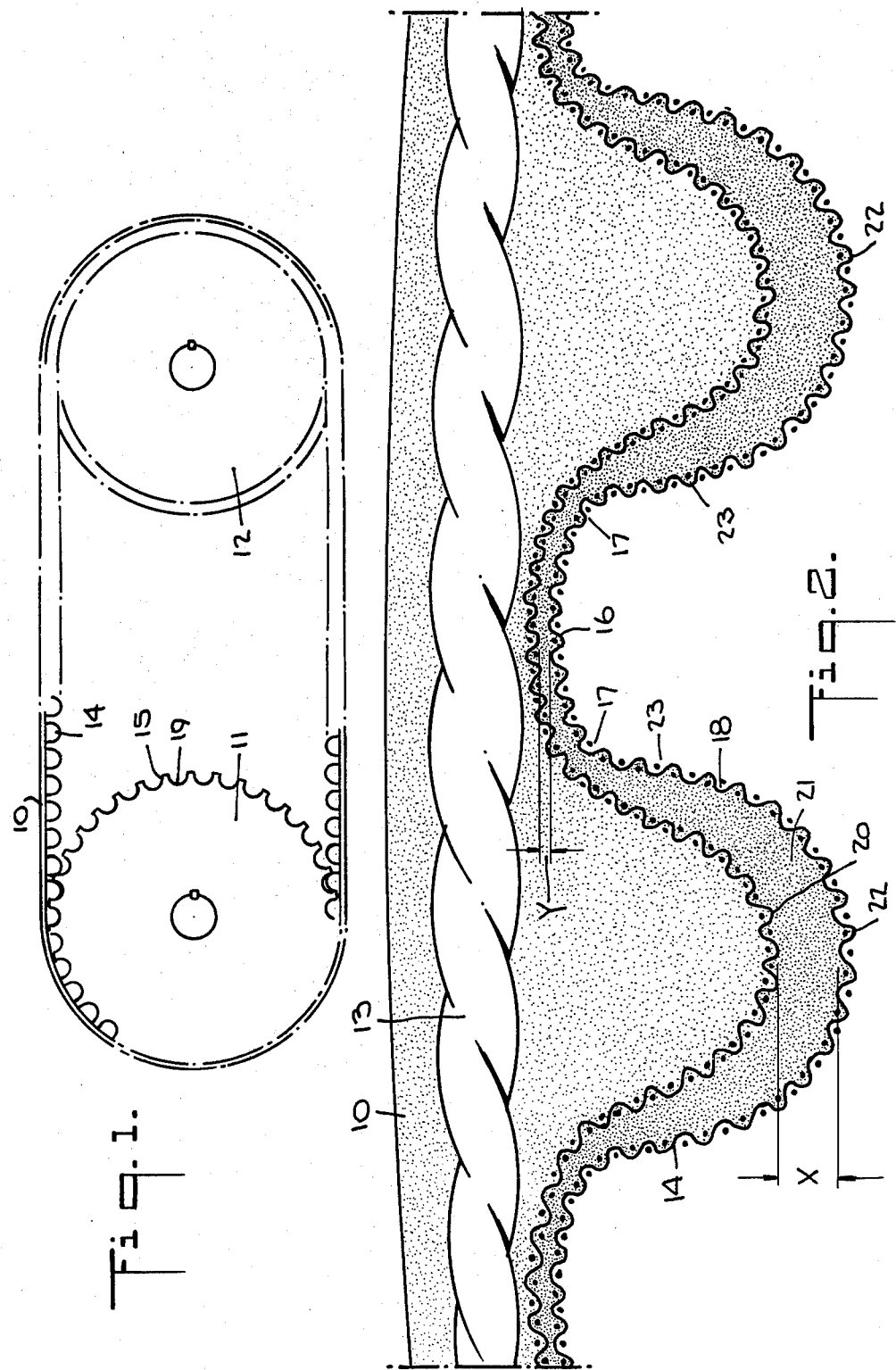

TOOTHED POSITIVE DRIVE POWER TRANSMISSION BELT WITH A FABRIC REINFORCEMENT SUSPENDED WITHIN THE BELT TEETH

BACKGROUND OF THE INVENTION

This invention relates to a toothed positive drive power transmission belt, and more particularly the reinforcement of the teeth of such a belt for high horsepower capacity.

The use of a positive drive belt having teeth on at least one of its faces for meshing with at least two toothed pulleys to form a positive drive power transmission system is common.

Various attempts have been made to improve the horsepower capacity of such tooth belts. They have included modifying the profile of the belt teeth and the use of various belt constructions and materials. Extremely high horsepower capacity has been obtained by the use of curvilinear teeth constructed in accordance with the teachings of U.S. Pat. No. 3,756,091, issued Sept. 4, 1973. However, even this construction does not provide the horsepower capacity required for severe product applications such as oil field pumps.

BRIEF SUMMARY OF THE INVENTION

It is an object of the present invention to provide an improved endless power transmission belt having a higher horsepower capacity than previously obtainable on equivalent size belts.

In accordance with the teachings of the present invention there is suspended within the body of the belt teeth a layer of stretchable or non-stretchable reinforcing fabric including woven and non-woven fabrics, high modulus plastic sheeting such as oriented nylon sheet, or cords such as those used in tire cord fabric. Preferably the layer is constituted of a fabric or cords of nylon. Other synthetic fibers such as rayon, polyester, aramid or natural fibers such as cotton, glass or metal may also be used. The fabric may be of any suitable weave such as square woven, knit, basket, twill or sateen. The reinforcing layer is separated from the outer surface of the belt teeth by a cushion layer of soft elastomeric material. The outer surface of the belt teeth may be covered by one or more layers of fabric or other suitable material. The cushion layer allows the outer surface of the belt teeth to flex and conform to the pulley profile without damage to the belt teeth as the belt and pulleys mesh.

U.S. Pat. No. 3,937,094, issued Feb. 10, 1976, and U.S. Pat. No. 4,099,422, issued July 11, 1978 disclose positive drive toothed belts having trapezoidal teeth wherein the belt teeth have an outer layer which is extremely rigid. This rigid layer is practically indeformable by flexion stresses particularly in comparison with the material forming the body of the teeth. The rigid layer is formed from at least two layers of square woven fabric doubled together. Because the fabrics may be rubber coated and since an adhesive may be used, there may be a thin layer of elastomeric material between the fabric layers. The result of such construction is an extremely rigid outer layer. The resulting belt has little or no give on its outer surface. Trapezoidal toothed belts as described above enter the pulley grooves and engage the pulley teeth by a sliding action of the belt teeth on the inclined plain of the sidewalls of the pulley teeth. This sliding action gently moves the belt teeth into position. Thus performance of trapezoidal toothed belts are improved if the belt teeth have a rigid layer on their outer surface to aid such sliding motion. The rigid outer layer of these two patents does not act as an internal reinforcement of the belt teeth and is clearly not analogous to the present invention.

Curvilinear shaped belt teeth such as are disclosed by U.S. Pat. No. 3,756,091 engage the corresponding pulleys in a semi-rolling action over the edge of the pulley teeth rather than in a sliding action. Accordingly a rigid outer layer is not desired. The outer surface of curvilinear teeth must be flexible so that the teeth surfaces will compress as the teeth enter and leave the pulley grooves and thus avoid wear on the flank of the teeth, i.e., the belt teeth must be able to flex and conform to the pulley grooves without damage. At the same time, it is important for preventing the shearing of belt teeth under high load (i.e. for high horsepower capacity) for the belt teeth to have high internal rigidity. The present invention allows this combination of desired and contradictory traits by reinforcing the central portions of the belt teeth while allowing their outer surface to be flexible.

The present invention also offers a method for increasing the horsepower capacity and life of toothed belts having various other profiles including those having trapezoidal teeth. As will be more fully explained hereinafter when the present construction is used in belts having trapezoidal teeth there is only a slight increase in horsepower capacity but a marked increase in belt life.

Many attempts have been made over the years to reinforce V-belts to stop transverse flex cracking of such belts when in contact with pulleys. See for example U.S. Pat. No. 2,163,347, issued June 20, 1939 and U.S. Pat. No. 3,968,703, issued July 13, 1976, which show various internal supports for the prevention of such flex cracking. Equally, the use of layers of soft elastomers in V-belts is known. U.S. Pat. No. 3,348,422 issued Oct. 25, 1967 and U.S. Pat. No. 3,473,989 issued Oct. 21, 1969 show such constructions to prevent cracking of V-belts. Such V-belts are not positive drive systems, do not have meshing teeth, and therefore do not face the problem of engagement met by the present invention. Such V-belts are clearly not analogous to the present invention.

BRIEF DESCRIPTION OF THE DRAWINGS

The accompanying drawings show the preferred embodiment of the present invention in which:

FIG. 1 is a longitudinal cross-sectional view looking transversely of a positive drive of the invention with a belt shown in engagement with its cooperating pulleys; and FIG. 2 is an enlarged fragmentary longitudinal cross-sectional side view of the belt of the preferred embodiment of this invention.

DETAILED DESCRIPTION OF THE INVENTION

As seen in FIG. 1, the endless belt 10 of the present invention engages the driving and driven toothed pulleys 11 and 12. Belt 10 is provided with a tensile member 13 comprising a plurality of turns of continuous strands of filamentary material. The tensile member 13 carries substantially the entire working load imposed upon the belt 10. For up to the maximum load for which the belt 10 is designed, the tensile member 13 is substantially inextensible. The belt teeth 14 are attached to the tensile member 13. The outward configuration of the belt teeth 14 and the pulley teeth 15 may be in conformity with the teaching of U.S. Pat. No. 3,756,091 or any other configuration requiring that the outer surface of the belt teeth 14 to be flexible. The inextensible tensile member 13 is embedded in the belt 10 at approximately the level of land area 16 between the roots 17 of the teeth 14 i.e. at the dedendum line. A conventional protective jacket 18 may extend over the outer surface of the belt teeth 14 and land area 16. The protective jacket 18, as is well known in the art, offers abrasion resistance for the toothed side of the belt 10 and may consist of a stretchable or non stretchable fabric or may be a layer of material bonded to the belt such as an ultra-high molecular weight polyethylene.

Curvilinear belt teeth 14 of this type engage their mating pulley teeth 15 and corresponding grooves 19 between pulley teeth 15 in a semi-rolling action over the edges of the pulley teeth 15. The surfaces of the belt teeth 14 should be flexible so that their surfaces will compress to avoid flank wear as the belt teeth 14 engage and leave the pulley grooves 19. For increased horsepower capacity it is, however, important to give the belt teeth internal rigidity to prevent tooth shear.

The present invention provides an improved belt construction designed to increase the horsepower capacity of belts having such curvilinear teeth without lessening the life of the belt through excessive flank wear. Equally when used in belt teeth of other configurations it will act both to increase horsepower capacity and belt life. When used in trapozoidal toothed belts, there is only minor improvements in horsepower capacity since the jumping of belt teeth out of the pulley grooves is the principal limitation on horsepower capacity and such jumping is not greatly improved by the present invention. Pliant trapezoidal teeth are prone to jump from the corresponding pulley grooves. However the life of such belts will be greatly extended because the internal reinforcement of the belt teeth acts to increase the shear resistance of the teeth.

In accordance with the present invention a reinforcing layer 20 is suspended internally of the belt tooth 14. The reinforcing layer may be a woven or non-woven fabric, high modulus plastic sheeting such as oriented nylon, or cords such as used in tire cord fabrics. Is is preferably formed from nylon but can be made of synthetic fibers such as rayon, polyesters, aramid or from natural fibers such as cotton, glass or metal. It may but need not be the same fabric as the protective jacket 18.

When the reinforcing layer is a fabric or a series of cords, the reinforcing cords should have a diameter of from 0.010" to 0.040" and be laid at an angle of from 0°–45° to the tensile member 13. If a sheet of plastic is used, it may have holes in its body to aid its bonding to the belt teeth. Between reinforcing layer 20 and the outer jacket 18 is a cushion layer 21 of elastomeric material. Cushion layer 21 may be made of the same material as the remaining elastomeric portion of the belt or it may be made of a material harder or softer than such remaining portions but preferably should have a Shore A hardness between 60 and 90.

Reinforcing layer 20 gives internal rigidity to the structure of the belt teeth 14 while permitting flexibility in the tip portion 22 and the flanks 23 of the belt teeth 14. This allows the belt teeth 14 to flex and conform to this mating pulley teeth 15 and grooves 19 without damage to the belt teeth 14 as they mesh together.

By reason of this construction, the outer portions of the belt teeth 14 are flexible. They are not subject to flank wear or cracking under repeated stress during operation. The cushion layer 21 serves to absorb the impact of the pulley teeth as the belt 10 moves around the pulleys 11 and 12. The cushioning effect acts to preserve the flex life of the belt tooth and therefore increase the life of the belt. The increased rigidity of the internal structure of the belt tooth 17 by reason of the reinforcing layer 20 increases the shear resistance of the belt tooth and thereby increases the horsepower capacity of the belt.

The location of the reinforcing layer 20 determines the profile of the cushion layer 21. The thickness of the rubber cushion layer 21 varies along the length of the belt teeth being thinnest in the land area 16 and thickest in the teeth tips 22. In FIG. 2 the thickness of the cushion layer 21 at tooth tip 22 is indicated as X and at the land area 16 as Y. In the preferred embodiment of the present invention Y may vary from ten percent (10%) to seventy percent (70%) of the thickness of the reinforcement fabric 20 in the finished belt (i.e. as compressed during construction) and X from twenty percent (20%) to five hundred percent (500%).

The location of the reinforcing layer 20 and the resulting profile of the cushion layer 21 may be varied to optimize the performance depending on pulley diameter, desired horsepower capacity and other application conditions. For example, in applications such as in high torsinal vibration environments, the belt teeth are subject to greater interference forces. Accordingly X should be greater in thickness than in a non vibrating environment to permit greater belt tooth deflection.

Chart I shows the effect on belt life versus variations in the thickness of the cushion layer 21. Chart I was derived from a series of tests. In the test all belts were constructed of the same materials. In the test, cushion layer 21 was composed of the same elastomeric compound as the rest of the belt. The body and cushion layer of the belts were constructed of a synthetic rubber as set forth in column 3 of U.S. Pat. No. 3,078,206, issued Feb. 19, 1963. The tensile member 13 is of glass 0.130" in diameter with a tensile strength of 1,000 pounds. There were six strands of tensile member 13 per inch of belt width. The protective jacket 18 and the reinforcing layer 20 are formed from high density type 66 nylon fabric, 35 warp yarns per inch and 25 fill yarns per inch, with a weight 12 oz. per square yard and having an elongation of not less than 100%. The protective jacket 18 was dipped into a latex and then dried. The belts were all constructed in the same manner with variations in the thickness of the cushion layer 21 between reinforcing layer 20 and the fabric jacket 18. Each belt had teeth constructed in accordance with the teachings of U.S. Pat. No. 3,756,091. They each had a 20 mm pitch, were 40 mm wide and 1800 mm long. Six belts were tested under the following conditions:

1. run on identical pulleys having a 1 to 1 ratio, each have 32 grooves and 20 mm pitch;
2. run at 1750 RPM;
3. run at 750 lbs tension; and
4. run at 80 horse power load.

In Chart I the thickness of the cushion layer in each test belt is listed for points X and Y of the test belts. The life in hours indicates the number of hours each of the six test belts ran under the test conditions described above before belt failure. The thickness of the reinforcement layer 20 was measured as 0.017" in a finished belt after being compressed during the construction of the belt.

CHART I

| Test Belt | Y Cushion layer Thickness at the land area | Percent of Compressed Reinforcement layer in the land area Thickness | X Cushion layer Thickness at the tooth tip | Percent of Compressed Reinforcement layer in the land area Thickness | Life in hours |
|---|---|---|---|---|---|
| A | 0 | 0 | 0 | 0 | 120 |
| B | 0.002 | 11.8 | .005 | 29.4 | 565 |
| C | 0.007 | 41.2 | .008 | 47.1 | 935 |
| D | 0.008 | 47.1 | .017 | 100.0 | 288 |
| E | 0.011 | 64.7 | .076 | 447.1 | 310 |
| F | 0.009 | 52.9 | .223 | 1311.7 | 6.5 |

The life of a similar belt tested on the same conditions without a reinforcing layer 20 is 6.5 hours. In test belt A, the fabric reinforcing layer 20 and the outer fabric 21 were positioned directly against each other so as to form the outer layer of the belt 10.

As can be seen from Chart I, there is an optimum cushion layer thickness and too much variation from it lessens belt life. For example Belt F with a very thick cushion layer 21 has the same life as a belt without a reinforcing layer 20. As can be seen from the chart, good results occur when the thickness of the cushion layer between said protective jacket 18 and the suspended reinforcing layer 20 is between 0.002" and 0.011" in the land area and between 0.005" and 0.076" in the tooth tip area. The best results are when the ranges are 0.002" and 0.007" and 0.005" and 0.020" respectively. In terms of the reinforcement layer 21 thickness they are ten percent (10%) to seventy percent (70%) in the land area and twenty percent (20%) to five hundred percent (500%) in the tooth tip area for best results.

The test belts were all produced by a modification of the method of construction shown in U.S. Pat. Nos. 3,078,205 and 3,078,206 both issued Feb. 19, 1963. The belt is constructed around a mold. First a layer of outer fabric 18, a layer of cushion rubber 21 and a reinforcing fabric 20 is positioned about the circular mold. Thereafter the tensile member 13 is helically wound around the mold and a layer of rubber applied. The belt is then formed in accordance with the teachings of said U.S. Pat. Nos. 3,078,205 and 3,078,206. Selection of the cushioning rubber which is to form cushion layer 21 and controlling of the tensions supplied to the tensile member during the helically winding of the cord will control the thickness of the cushion layer 21 at X and Y.

While the invention is described in connection with belts having curvilinear teeth as described in U.S. Pat. No. 3,756,091, the invention is equally useful in any elastomeric belt where the belt teeth have a rolling action rather than the sliding action when mating with the corresonding pulleys. While the invention is most useful in such belts, the construction can be used in other belts to extend belt life such as those having trapezoidal shaped teeth or belts having teeth with both curvilinear and rectilinear surfaces.

While a single reinforing layer of fabric or cord has been shown, two or more reinforcing layers may be used. The total cushion layer thickness in such multi layer belts would have the same limitations as in a belt with a single layer of reinforcement.

While the invention is described in connection with belts made from a rubber or rubber-like composition, it is equally useful when the belt is made from other flexible polymeric materials such as urethane or flexible plastic materials such as certain polyester resins, etc.

We claim:

1. A positive drive belt for operation with toothed pulleys comprising an elastomeric body, a reinforcing tensile member imbedded in said body, teeth on at least one surface of said body said teeth having tip regions spaced from said reinforcing member and said teeth separated by land areas, a flexible covering on the outer surface of the belt teeth and land areas and a curvilinear shaped suspended reinforcing means within each tooth separated from the outer surface of the tooth and from the outer surface of the land areas by a curvilinear shaped cushion layer of elastomeric material, said cushion layer having a thickness varying gradually between a first given thickness in the region of the land areas to a second substantially greater given thickness in the tip regions whereby the outer surface of the belt is free to flex as the belt engages its pulleys while the inner portion of the belt teeth are structurally reinforced against tooth shear.

2. A positive drive belt in accordance with claim 1 in which the thickness of the cushion layer between said flexible covering and said suspended reinforcing means in the land area of the belt is from approximately fourteen percent to approximately forty seven percent of the thickness of the cushion layer in the tooth tip area of the belt.

3. A positive drive belt in accordance with claim 1 in which the thickness of the cushion layer between said flexible covering and said suspended reinforcing means is between 0.002" and 0.11" in the land area and between 0.005" and 0.100" in the tooth tip of said belt.

4. A positive drive belt in accordance with claim 1 in which the thickness of the cushion layer between said flexible covering and said suspended reinforcing means is between 0.002" and 0.011" in the land area of the belt and between 0.005" and 0.076" in the tooth tip area of the belt.

5. A positive drive belt in accordance with claim 1 in which the thickness of the cushion layer between said flexible covering and said suspended reinforcing means is between 0.002" and 0.007" in the land area of the belt and between 0.005" and 0.020" in the tooth tip area of the belt.

6. A positive drive belt in accordance with claim 1 in which the suspended reinforcing means is a fabric.

7. A positive drive belt in accordance with claim 1 in which the suspended reinforcing means is a layer of parallel cords.

8. A positive drive belt in accordance with claim 1 in which the suspended reinforcing means is a stretchable fabric.

9. A positive drive belt in accordance with claim 1 in which the suspended reinforcing means is a non-stretchable fabric.

10. A positive drive belt in accordance with claim 1 in which the belt teeth have trapezoidal profiles.

11. A positive drive belt in accordance with claim 1 in which the belt teeth mesh with corresponding pulley teeth in a rolling action.

12. A positive drive belt in accordance with claim 1 in which the cushion layer between said flexible covering and said suspended reinforcing means is of a material which is softer than the elastomeric material of said body of the belt.

13. A positive drive belt in accordance with claim 12 in which the cushion layer has a Shore A hardness between 60 and 90.

* * * * *